(12) United States Patent
Huang et al.

(10) Patent No.: US 11,476,533 B2
(45) Date of Patent: Oct. 18, 2022

(54) BATTERY MODULE, BATTERY PACK, AND APPARATUS USING BATTERY CELL

(71) Applicant: CONTEMPORARY AMPEREX TECHNOLOGY CO., LIMITED, Ningde (CN)

(72) Inventors: Aifang Huang, Ningde (CN); Rongzhao Pan, Ningde (CN); Hanqing Gao, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 80 days.

(21) Appl. No.: 17/112,727

(22) Filed: Dec. 4, 2020

(65) Prior Publication Data
US 2021/0091347 A1 Mar. 25, 2021

Related U.S. Application Data

(63) Continuation of application No. PCT/CN2020/102833, filed on Jul. 17, 2020.

(30) Foreign Application Priority Data

Aug. 20, 2019 (CN) .......................... 201910770671.9

(51) Int. Cl.
*H01M 50/20* (2021.01)
*H01M 10/6554* (2014.01)
(Continued)

(52) U.S. Cl.
CPC ........... *H01M 50/20* (2021.01); *H01M 10/04* (2013.01); *H01M 10/4207* (2013.01); *H01M 10/6554* (2015.04); *H01M 50/24* (2021.01)

(58) Field of Classification Search
CPC .. H01M 50/20; H01M 50/24; H01M 10/6554; H01M 10/04; H01M 10/4207
See application file for complete search history.

(56) References Cited

U.S. PATENT DOCUMENTS

2010/0247994 A1* 9/2010 Park ................... H01M 10/4207
429/96
2011/0206948 A1 8/2011 Asai et al.
(Continued)

FOREIGN PATENT DOCUMENTS

| CN | 203760534 U | 8/2014 |
| CN | 106299187 A | 1/2017 |

(Continued)

OTHER PUBLICATIONS

Contemporary Amperex Technology Co., Limited, International Search Report and Written Opinion, PCT/CN2020/102833, dated Oct. 27, 2020, 12 pgs.

(Continued)

*Primary Examiner* — Jimmy Vo
(74) *Attorney, Agent, or Firm* — Morgan, Lewis & Bockius LLP

(57) ABSTRACT

This application relates to a battery module, including: battery cells arranged sequentially; an end plate that includes a first end sub-plate and a second end sub-plate, where the first end sub-plate and the second end sub-plate are arranged in a length direction of the battery module, the second end sub-plate is closer to the battery cells than the first end sub-plate, and a buffer spacing is formed between the first end sub-plate and the second end sub-plate; and a cell management unit that is disposed on a side of the first end sub-plate facing away from the second end sub-plate. The buffer spacing disposed between the first end sub-plate and the second end sub-plate can effectively reduce or even avoid deformation of the first end sub-plate under an expan- (Continued)

sion force generated by the battery cells, thereby protecting the cell management unit from a failure caused by the external force.

18 Claims, 14 Drawing Sheets

(51) Int. Cl.
  *H01M 50/24* (2021.01)
  *H01M 10/04* (2006.01)
  *H01M 10/42* (2006.01)

(56) References Cited

U.S. PATENT DOCUMENTS

2018/0183025 A1\* 6/2018 Cao ................. H01M 50/20
2019/0207177 A1   7/2019 You

FOREIGN PATENT DOCUMENTS

| CN | 207441797 U | 6/2018 |
| CN | 208111517 U | 11/2018 |
| CN | 209016124 U | 6/2019 |
| CN | 109994665 A | 7/2019 |
| CN | 109994666 A | 7/2019 |
| EP | 3343667 A1 | 7/2018 |
| KR | 20190074712 A | 6/2019 |
| WO | WO2012042913 A1 | 4/2012 |
| WO | WO2013119818 A1 | 8/2013 |

OTHER PUBLICATIONS

Contemporary Amperex Technology Co., Limited, Supplementary European Search Report, EP20811954, dated Sep. 8, 2021, 2 pgs.
First Patent Search Report, CN201910770671.9, dated May 21, 2021, 2 pgs.

\* cited by examiner

BATTERY MODULE, BATTERY PACK, AND APPARATUS USING BATTERY CELL

CROSS REFERENCE TO RELATED APPLICATIONS

This application is a continuation application of PCT Patent Application No. PCT/CN2020/102833, entitled "BATTERY MODULE, BATTERY PACK, AND APPARATUS USING BATTERY CELL" filed on Jul. 17, 2020, which claims priority to Chinese Patent Application No. 201910770671.9, filed with the State Intellectual Property Office of the People's Republic of China on Aug. 20, 2019, and entitled "BATTERY MODULE", all of which are incorporated herein by reference in their entirety.

TECHNICAL FIELD

This application relates to the field of energy storage devices, and in particular, to a battery module. In addition, this application further relates to a battery pack and an apparatus using a battery cell.

BACKGROUND

With rapid development of the full electric vehicle industry, in order to sharpen the competitive edge, customers, namely, the whole vehicle plants, impose increasingly high requirements on energy density and structural strength of battery modules, so as to meet demands of terminal users for a high-endurance capability and adapt to various severe operating conditions.

A module end plate acts as the most important bearing structure of the battery module, and an optimized structure of the module end plate directly affects the energy density and structural strength. Currently, there are two types of commonly used end plates: aluminum alloy and stainless steel-plastic composite. However, for both types, deformation of the end plates cannot be prevented under an expansion force of a battery cell, and when a cell management unit is disposed on an outer surface of the end plate, the cell management unit is prone to a failure under the effect of the force.

SUMMARY

This application provides a battery module, so as to avoid a failure of a cell management unit caused by deformation of an end plate and improve the life of the battery module.
This application provides a battery module, including:
a plurality of battery cells arranged sequentially;
an end plate, where the end plate includes a first end sub-plate and a second end sub-plate;
the first end sub-plate and the second end sub-plate are arranged in a length direction of the battery module, the second end sub-plate is closer to the battery cells than the first end sub-plate, and a buffer spacing is formed between the first end sub-plate and the second end sub-plate; and
a cell management unit, where the cell management unit is disposed on a side of the first end sub-plate facing away from the second end sub-plate.
In some embodiments, the first end sub-plate includes a metal plate and an insulation fastener;
the insulation fastener includes a first body;
the metal plate is inserted into the first body; and
the cell management unit is secured to a side of the first body facing away from the second end sub-plate.
In some embodiments, a first slot is provided in one of the cell management unit and the first body, and a second buckle is disposed on the other; and a protrusion is disposed in the first slot, and the protrusion is fitted to the second buckle; and/or
a first buckle is disposed in one of the cell management unit and the first body, and a second slot is provided on the other; and the first buckle is fitted to the second slot.
In some embodiments, the first end sub-plate further includes an extension;
the extension is connected to a side of the first body facing the cell management unit, and the extension extends along the length direction of the battery module;
the second slot is formed in the extension; and
the first buckle is formed in the cell management unit.
In some embodiments, the first end sub-plate further includes a limiting plate; and
the limiting plate is connected to a side of the first body facing the cell management unit, so as to limit displacement of the cell management unit along a width direction of the battery module.
In some embodiments, the end plate further includes a third end sub-plate; and
the third end sub-plate is connected to a side of the second end sub-plate facing away from the first end sub-plate.
In some embodiments, the third end sub-plate is generally a flat plate structure, and a groove structure for adhesive or cushion is provided on a surface of the third end sub-plate.
In some embodiments, first connection members are disposed on both sides of the metal plate along the width direction of the battery module;
the second end sub-plate includes a second body and second connection members along the width direction of the battery module, and the second connection members are connected to both sides of the second body along the width direction of the battery module;
the third end sub-plate includes a third body and third connection members along the width direction of the battery module, and the third connection members are connected to both sides of the third body along the width direction of the battery module; and
the first connection member, the second connection member, and the third connection member are connected.
In some embodiments, a sleeve is further included, and a center line of the sleeve extends along a height direction of the battery module; and
the first connection member, the second connection member, and the third connection member are all connected to an outer wall of the sleeve.
In some embodiments, the insulation fastener includes a first lifting member, and the first lifting member is disposed at the top of the first body along a height direction of the battery module;
the second end sub-plate includes a second lifting member, and the second lifting member is disposed at the top of the second end sub-plate along the height direction of the battery module;
the third end sub-plate includes a third lifting member, and the third lifting member is disposed at the top of the third end sub-plate along the height direction of the battery module; and
after the first lifting member, the second lifting member, and the third lifting member are connected, a lifting member used for lifting the battery module is formed.

In some embodiments, a reinforcing rib is formed on one or both sides of the second end sub-plate along the length direction of the battery module.

This application further provides a battery pack, and the battery pack includes a case and the foregoing battery module disposed in the case.

In some embodiments, the case has an accommodating cavity, the accommodating cavity accommodates one battery module or at least two battery modules, the battery modules are disposed in parallel along a length direction or a width direction of the battery pack, and each battery module is secured to the case.

This application further provides an apparatus using a battery cell, and the apparatus includes the foregoing battery module or the foregoing battery pack.

The technical solutions provided in this application can achieve the following beneficial effects:

The battery module provided in this application includes a plurality of battery cells, an end plate, and a cell management unit. The end plate includes a first end sub-plate and a second end sub-plate that are disposed along the length direction of the battery module. The second end sub-plate is disposed close to the battery cells, and a buffer spacing is formed between the first end sub-plate and the second end sub-plate. The cell management unit is disposed on the side of the first end sub-plate facing away from the second end sub-plate. During charging of the battery module, the battery cells generate an expansion force. Because the second end sub-plate is disposed close to the battery cells, the second end sub-plate is directly affected by the expansion force. As charging time of the battery cell increases, the expansion force generated by the battery cell gradually increases. When the expansion force becomes large enough to deform the second end sub-plate, the second end sub-plate deforms toward the first end sub-plate, that is, the second end sub-plate causes the buffer spacing to become smaller. In other words, because the buffer spacing is present between the first end sub-plate and the second end sub-plate, the first end sub-plate can be effectively protected from being affected by deformation of the second end sub-plate when the second end sub-plate becomes deformed. The buffer spacing disposed between the first end sub-plate and the second end sub-plate can effectively avoid deformation of the first end sub-plate under the expansion force generated by the battery cells, thereby protecting the cell management unit disposed on the side of the first end sub-plate facing away from the second end sub-plate from a failure caused by the external force. This improves the life of the cell management unit and further improves the service life of the battery module.

It should be understood that the foregoing general descriptions and the following detailed descriptions are merely examples, and do not constitute any limitation on this application.

Figure 1:
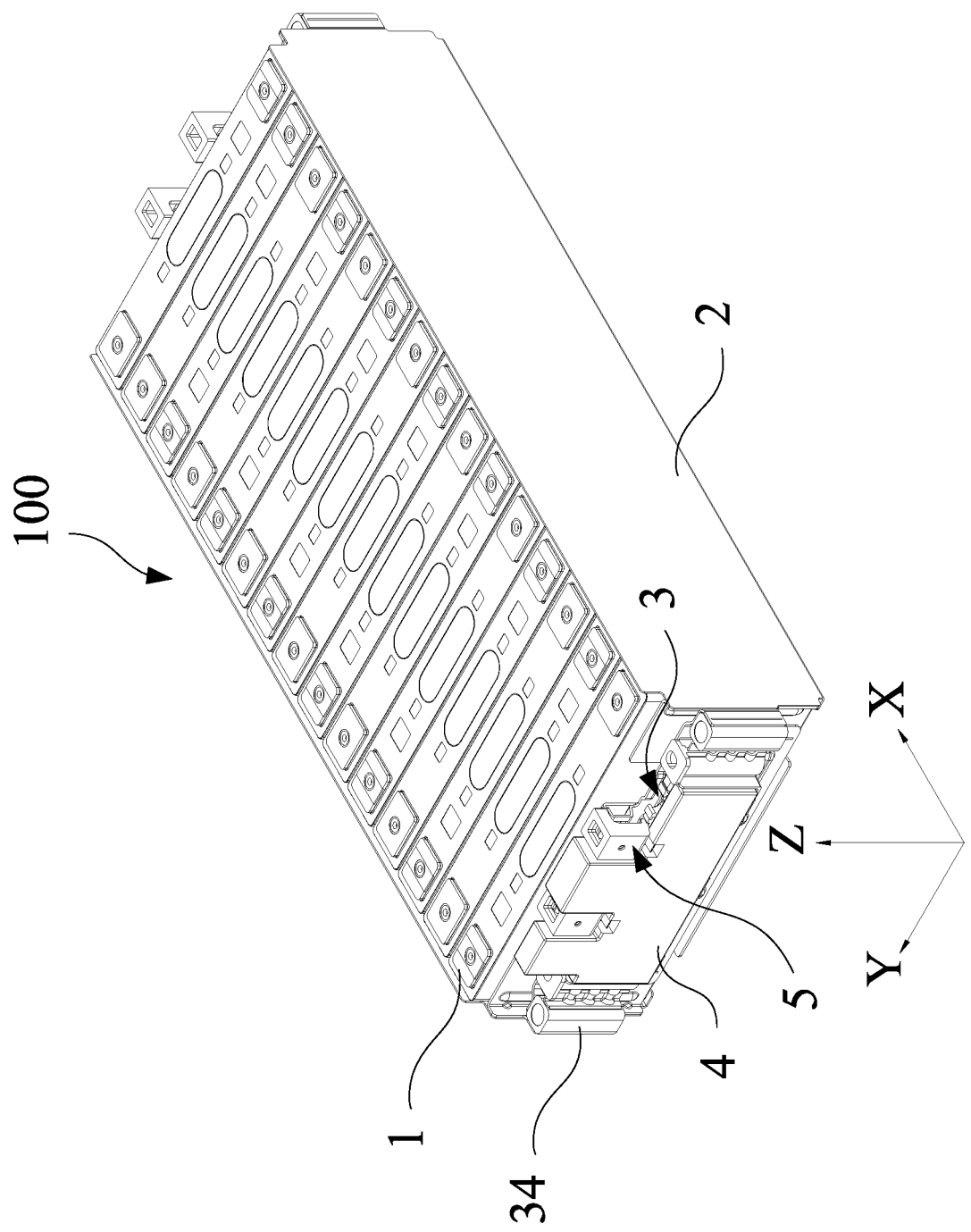
FIG. 1 is a schematic structural diagram of a battery module according to an embodiment of this application.

REFERENCE NUMERALS 100. battery module;
1. battery cell;
2. side plate;
3. end plate;
31. first end sub-plate;
311. metal plate;
311a. first connection member;
312. insulation fastener;
312a. first body;
312b. first lifting member;
313. second buckle;
314. second slot;
315. limiting plate;
316. extension;
32. second end sub-plate;
321. reinforcing rib;
322. second body;
323. second connection member;
324. second lifting member;
33. third end sub-plate;
331. third body;
332. third connection member;
333. third lifting member;
34. sleeve;
35. buffer spacing;
4. cell management unit;
41. first slot;
42. protrusion;
43. first buckle;
5. lifting member.

The accompanying drawings herein are incorporated in the specification as a part of the specification, showing embodiments that are in accordance with this application, and used together with the specification to explain a principle of this application.

DESCRIPTION OF EMBODIMENTS

The following clearly describes the technical solutions in this application with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The singular forms preceded by "a/an", "the" and "this" used in the embodiments of this application and the appended claims are also intended to include their plural forms, unless otherwise specified expressly in the context.

It should be understood that the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be noted that the directional terms such as "up", "down", "left", and "right" described in the embodiments of this application are described as seen from the angles shown in the accompanying drawings, and should not be understood as a limitation on the embodiments of this application. In addition, in the context, it should be further understood that when an element is referred to as being "above" or "under" another element, the element can either be directly connected "above" or "under" the another element, or be indirectly connected "above" or "under" the another element through an intermediate element.

A battery pack includes a case and a battery module 100 disposed in the case. The case may be made of aluminum, aluminum alloy, or other metal materials. The case has an accommodating cavity. In a possible design, the case is a top-open case structure and includes a top cover. A size of the top cover is equivalent to that of an opening at the top of the case, and the top cover may be secured over the opening by using fasteners such as bolts, so as to form the accommodating cavity. In addition, in order to improve sealing performance of the case, a sealing member may further be disposed between the top cover and the case.

The accommodating cavity of the case in the battery pack can accommodate one or at least two battery modules 100. The battery modules 100 may be disposed in parallel along a length direction of the battery pack, or disposed in parallel along a width direction of the battery pack, and each battery module 100 is secured to the case.

Figure 2:
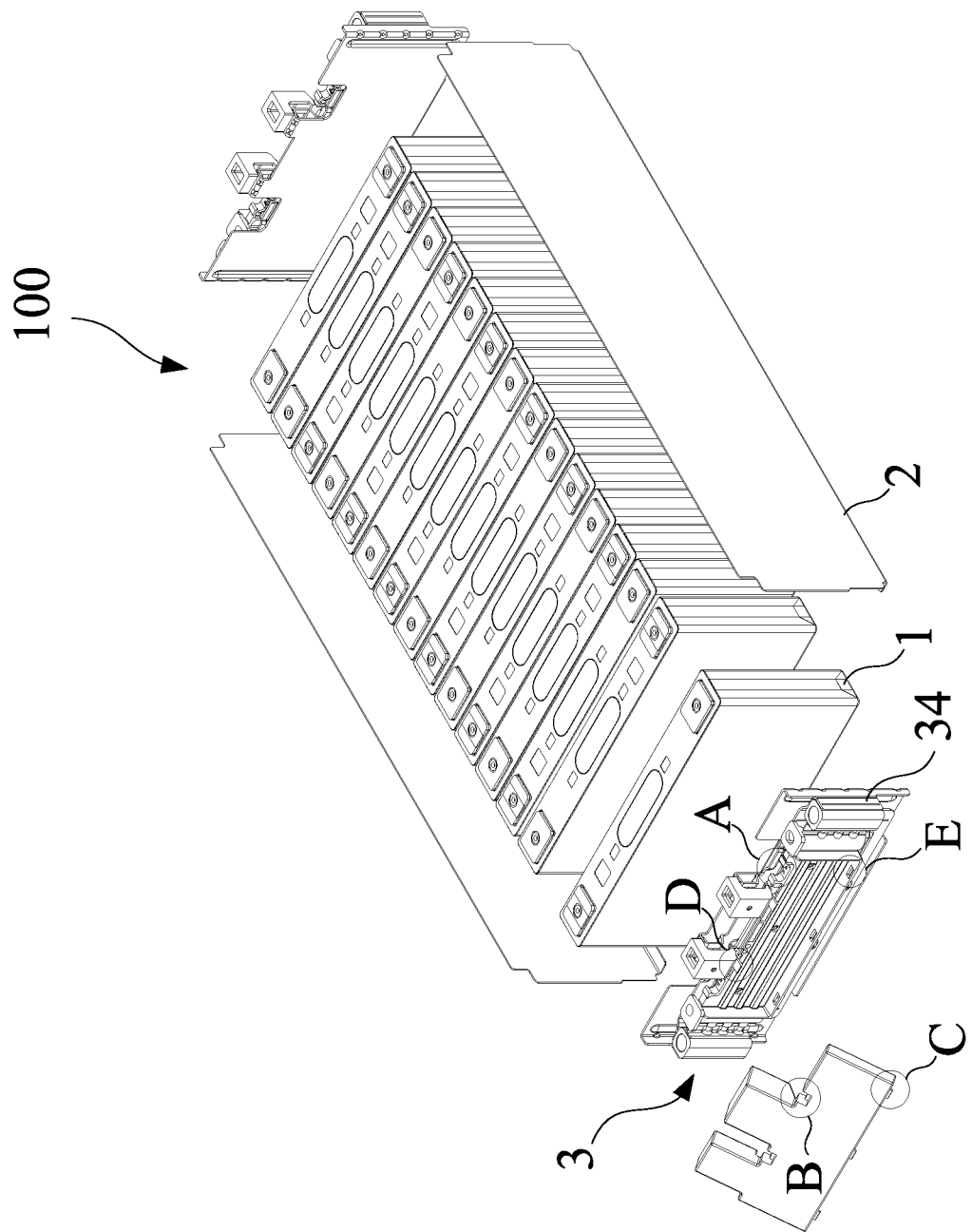
FIG. 2 is a schematic exploded view of a battery module according to an embodiment of this application.

FIG. 1 is a schematic structural diagram of a battery module according to an embodiment of this application; FIG. 2 is a schematic exploded view of the battery module according to this embodiment of this application; and FIG. 3 is a locally enlarged view of position A in FIG. 2.

Figure 3:
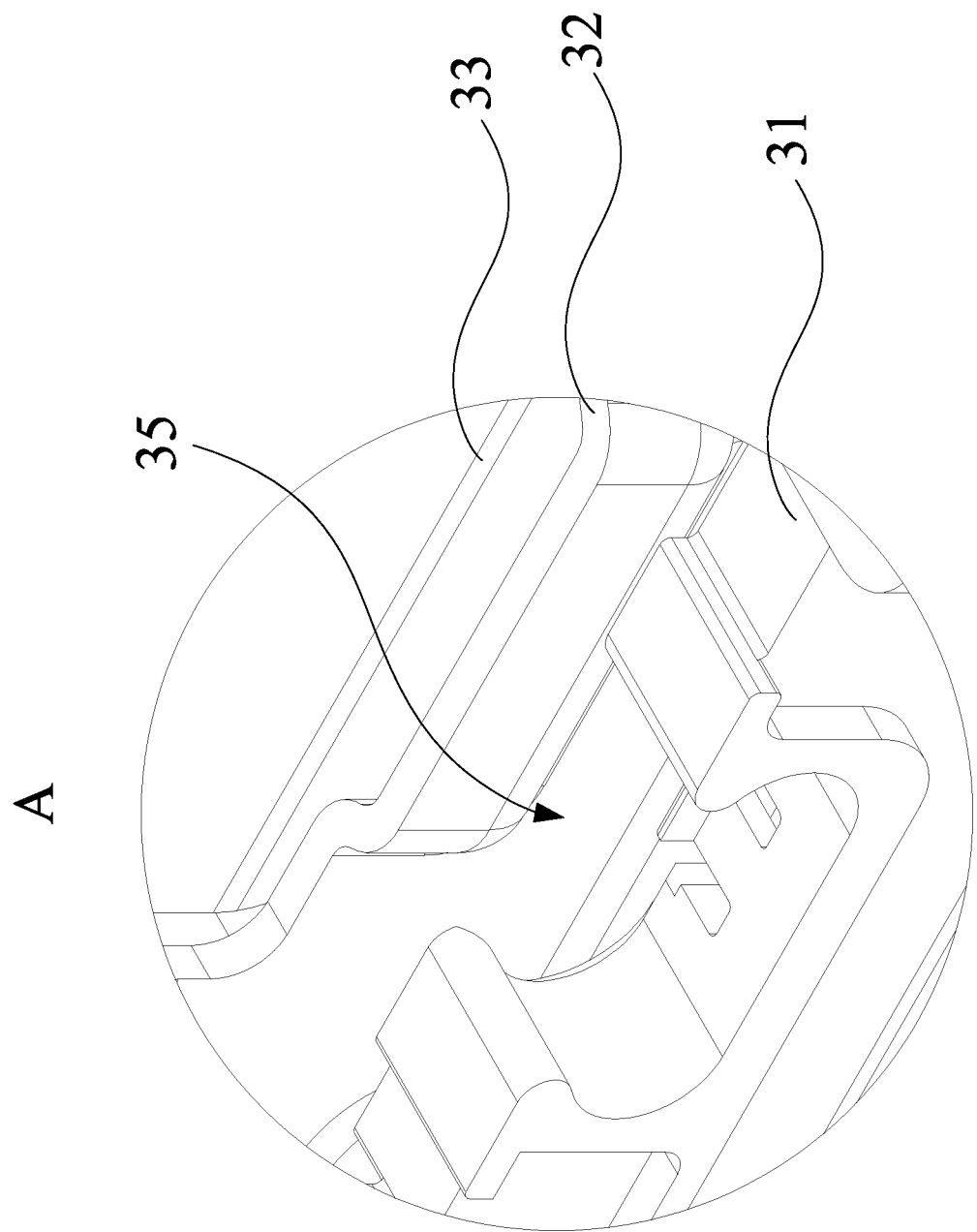
FIG. 3 is a locally enlarged view of position A in FIG. 2.

As shown in FIG. 1 to FIG. 3, this embodiment of this application provides a battery module 100, including a plurality of battery cells 1, an end plate 3, a side plate 2, and a cell management unit 4.

The plurality of battery cells 1 are arranged sequentially, and the end plate 3 includes a first end sub-plate 31 and a second end sub-plate 32. The side plate 2 is connected to the end plate 3. The first end sub-plate 31 and the second end sub-plate 32 are arranged along a length direction (X direction) of the battery module 100, and the second end sub-plate 32 is closer to a battery cell 1 than the first end sub-plate 31. A buffer spacing 35 is formed between the first end sub-plate 31 and the second end sub-plate 32, and the cell management unit 4 is disposed on a side of the first end sub-plate 31 facing away from the second end sub-plate 32.

The battery module 100 provided in this embodiment of this application includes the plurality of battery cells 1, the end plate 3, and the cell management unit 4.

The end plate 3 includes the first end sub-plate 31 and the second end sub-plate 32 that are disposed along the length direction of the battery module 100. The second end sub-plate 32 is disposed close to the battery cells 1, and the buffer spacing 35 is formed between the first end sub-plate 31 and the second end sub-plate 32. The cell management unit 4 is disposed on the side of the first end sub-plate 31 facing away from the second end sub-plate 32. During charging and discharging of the battery module 100, the battery cells 1 generate an expansion force. Because the second end sub-plate 32 is disposed close to the battery cells 1, the second end sub-plate 32 is directly affected by the expansion force. As a quantity of charging and discharging times of the battery cells 1 increases, the expansion force generated by the battery cells 1 gradually increases. When the expansion force becomes large enough to deform the second end sub-plate 32, the second end sub-plate 32 deforms toward the first end sub-plate 31, that is, the second end sub-plate 32 causes the buffer spacing 35 to become smaller. In other words, because the buffer spacing 35 is present between the first end sub-plate 31 and the second end sub-plate 32, the first end sub-plate 31 can be effectively protected from being affected by deformation of the second end sub-plate 32 when the second end sub-plate 32 becomes deformed. The buffer spacing 35 disposed between the first end sub-plate 31 and the second end sub-plate 32 can effectively avoid deformation of the first end sub-plate 31 under the expansion force generated by the battery cells 1, thereby protecting the cell management unit 4 disposed on the side of the first end sub-plate 31 facing away from the second end sub-plate 32 from a failure caused by the external force. This improves the life of the cell management unit 4 and further improves the service life of the battery module 100.

Figure 4:
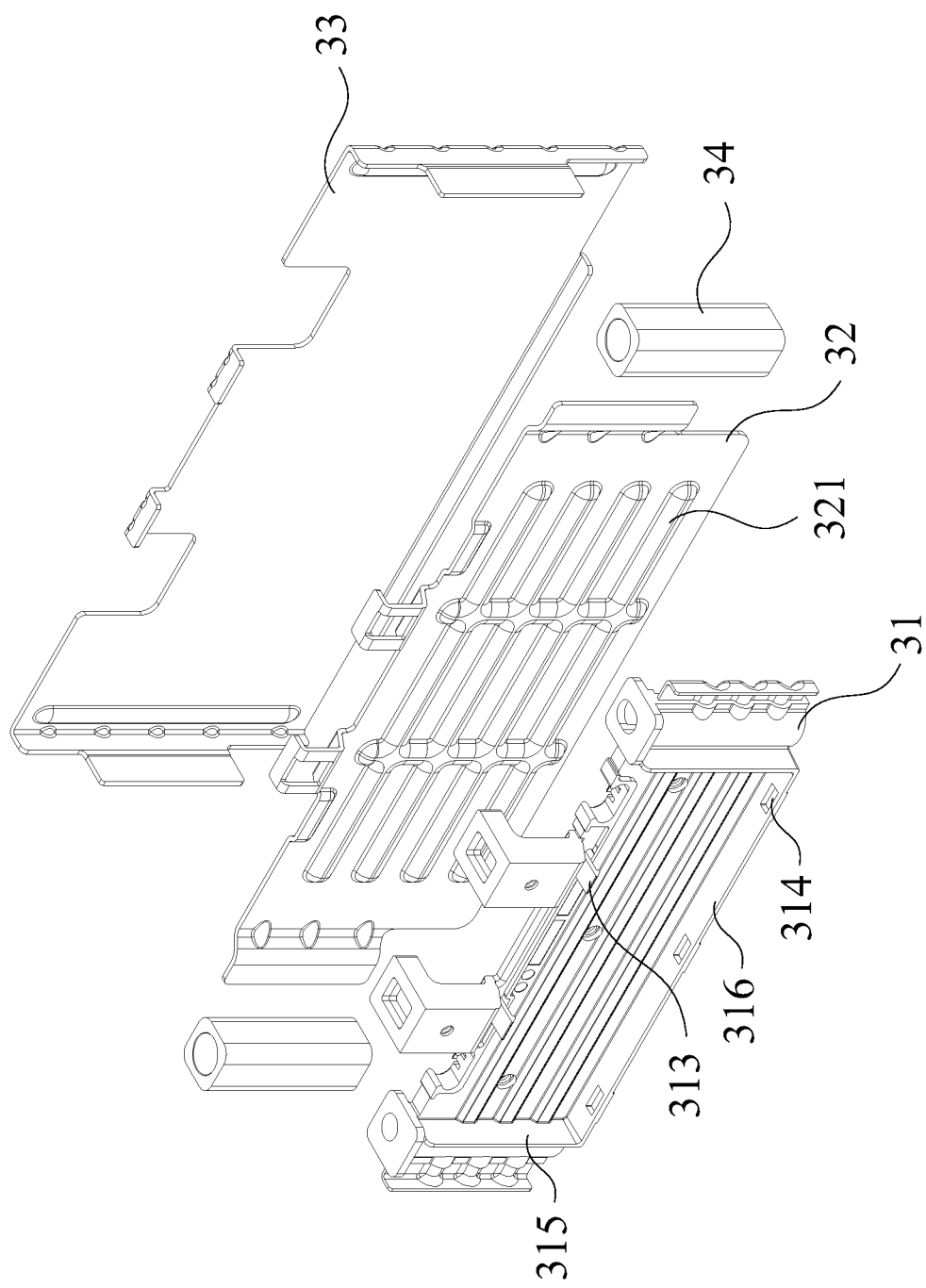
FIG. 4 is a schematic structural diagram of an end plate in a battery module according to an embodiment of this application.
Figure 5:
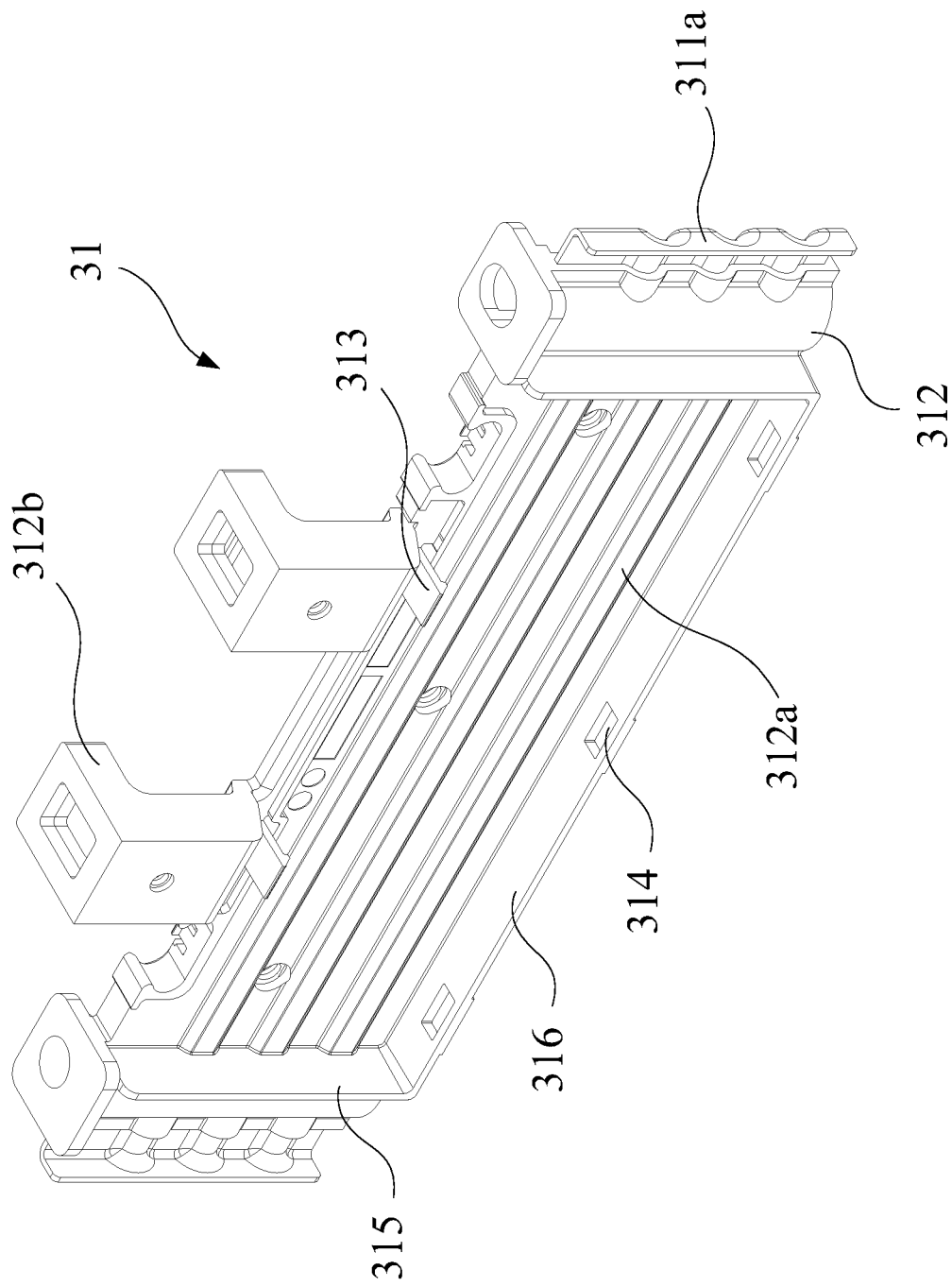
FIG. 5 is a schematic structural diagram of a first end sub-plate in a battery module according to an embodiment of this application.
Figure 6:
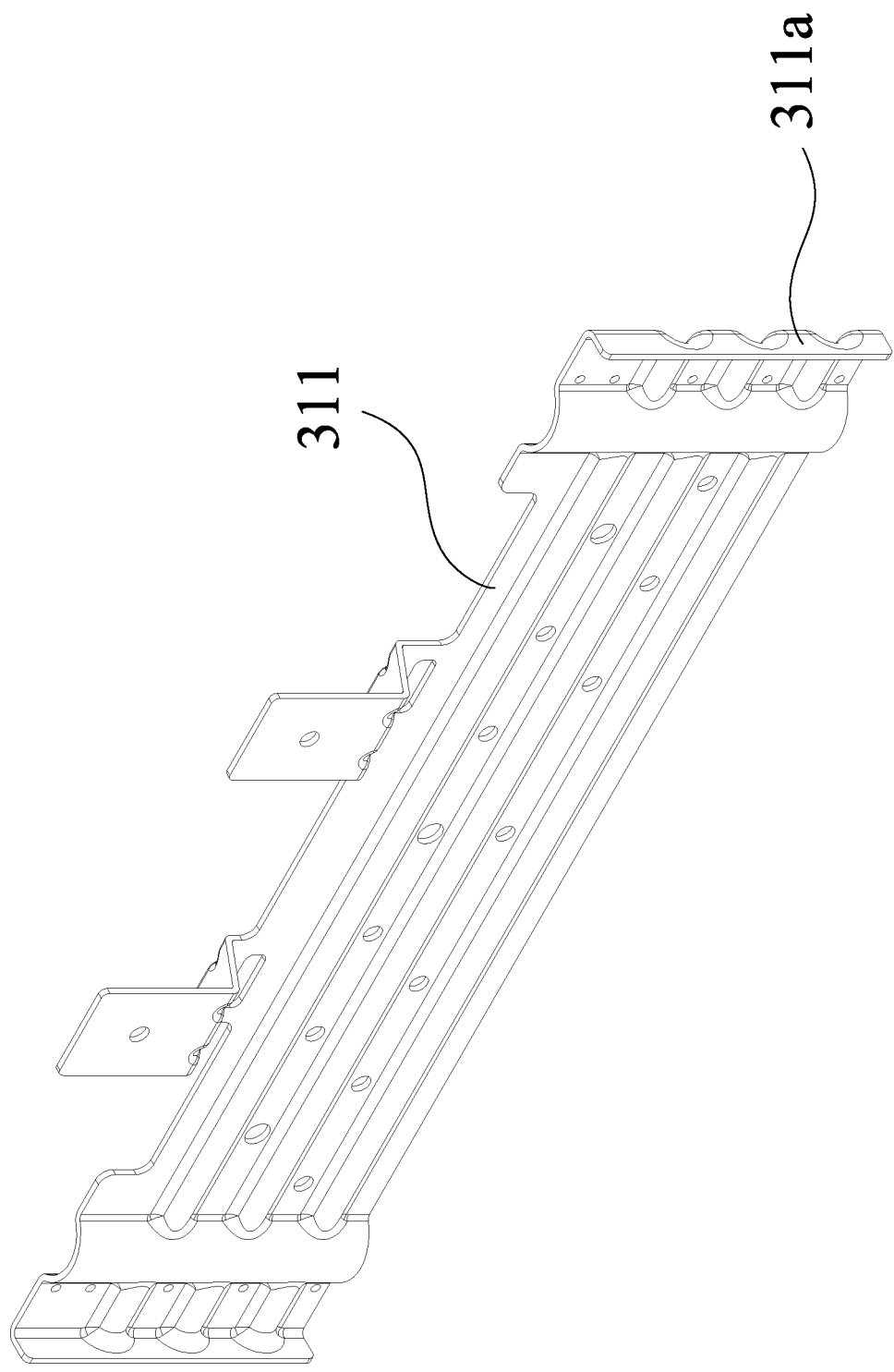
FIG. 6 is a schematic structural diagram of a metal plate in a battery module according to an embodiment of this application.
Figure 7:
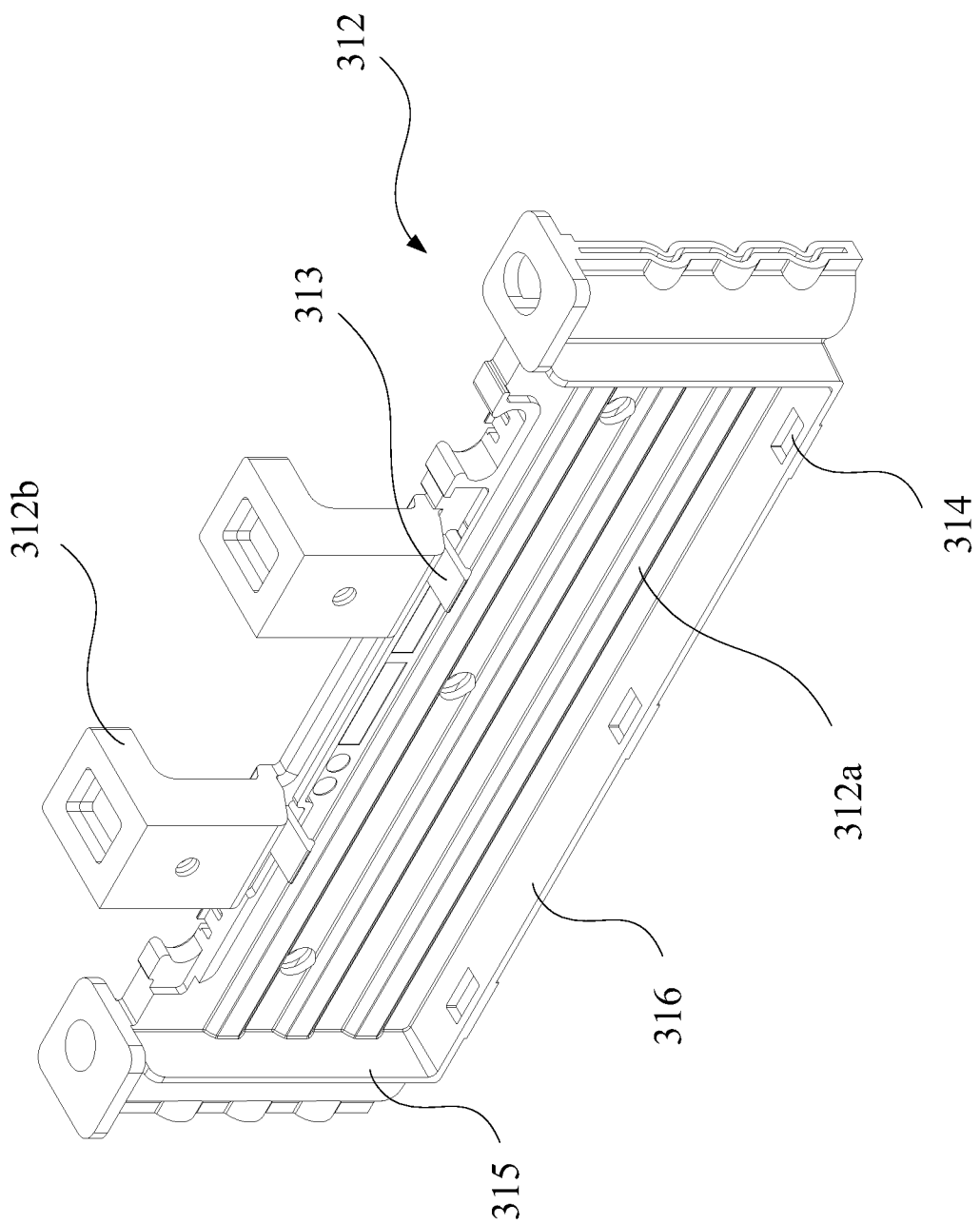
FIG. 7 is a schematic structural diagram of an insulation fastener in a battery module according to an embodiment of this application.

FIG. 4 is a schematic structural diagram of an end plate in a battery module according to an embodiment of this application; FIG. 5 is a schematic structural diagram of a first end sub-plate in the battery module according to this embodiment of this application; FIG. 6 is a schematic structural diagram of a metal plate in the battery module according to this embodiment of this application; and FIG. 7 is a schematic structural diagram of an insulation fastener in the battery module according to this embodiment of this application.

As shown in FIG. 4 to FIG. 7, in an implementation of the foregoing first end sub-plate 31, the first end sub-plate 31 includes a metal plate 311 and an insulation fastener 312. The insulation fastener 312 includes a first body 312a, the metal plate 311 is inserted into the first body 312a, and the cell management unit 4 is secured to a side of the first body 312a facing away from the second end sub-plate 32.

The first end sub-plate 31 includes the metal plate 311 used for increasing strength of the first end sub-plate 31. Because the cell management unit 4 is disposed on one side of the first end sub-plate 31 facing away from the second end sub-plate 32, in order to insulate the cell management unit 4 from the metal plate 311, the insulation fastener 312 is disposed on the outside of the metal plate 311, thereby effectively isolating the metal plate 311 from the cell management unit 4. This avoids a short circuit of the cell management unit 4 and improves safety of the battery module 100.

In addition, the insulation fastener 312 includes the first body 312a, and the metal plate 311 is inserted into the first body 312a, so as to implement fitting of the insulation fastener 312 and the metal plate 311.

Insertion of the metal plate 311 into the first body 312a includes full insertion and partial exposure. In actual cases, for ease of injection molding, a through hole is provided on a side, extending along a width direction (Y direction) of the battery module 100, of the first body 312a, that is, the metal plate 311 is partially exposed from the first body 312a. Because an exposed area is very small, an insulation effect of the first body 312a is not affected. Moreover, because the through hole is provided, fluidity of an injection molding material can be improved and an injection molding speed be increased during injection molding of the first body 312a. After injection molding, the through hole helps heat dissipation of the injection molding material, and accelerates solidification of the injection molding material, thereby improving fabrication efficiency of the insulation fastener 312.

In addition, disposition of the insulation fastener 312 facilitates disposition of a connection structure for connecting the first end sub-plate 31 to the cell management unit 4 on the insulation fastener 312, thereby simplifying connection between the cell management unit 4 and the first end sub-plate 31.

The insulation fastener 312 is formed by injection molding of a material that includes a plastic material. During fabrication of the first end sub-plate 31, the metal plate 311 is placed in an injection mold, and then a liquid injection material is injected into the injection mold. Finally, the injection material is cooled, and the injection material solidifies to form the insulation fastener 312 and also connect the metal plate 311 to the insulation fastener 312.

Figure 8:
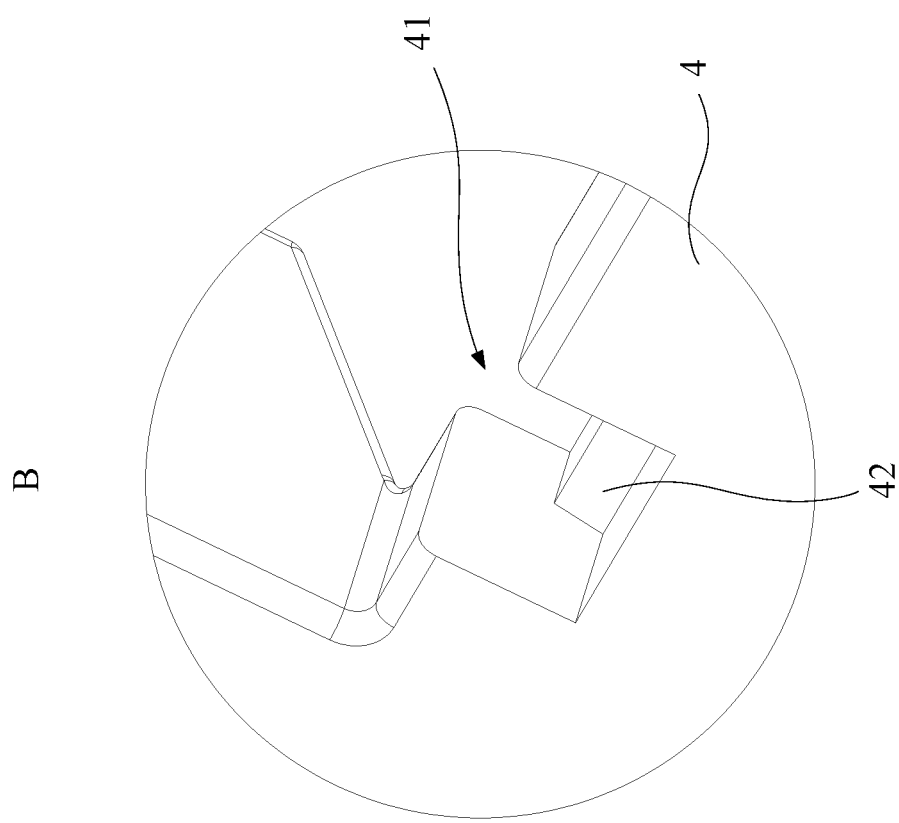
FIG. 8 is a locally enlarged view of position B in FIG. 2.
Figure 9:
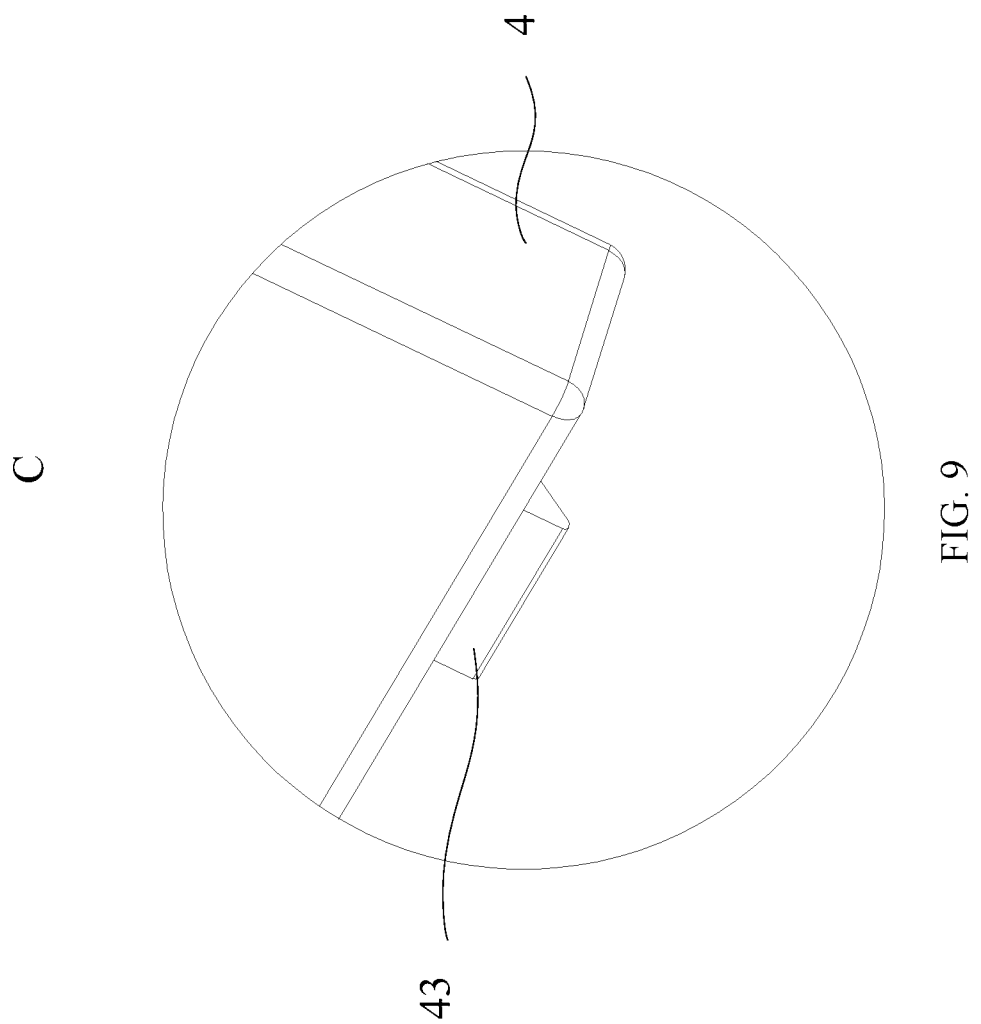
FIG. 9 is a locally enlarged view of position C in FIG. 2.
Figure 10:
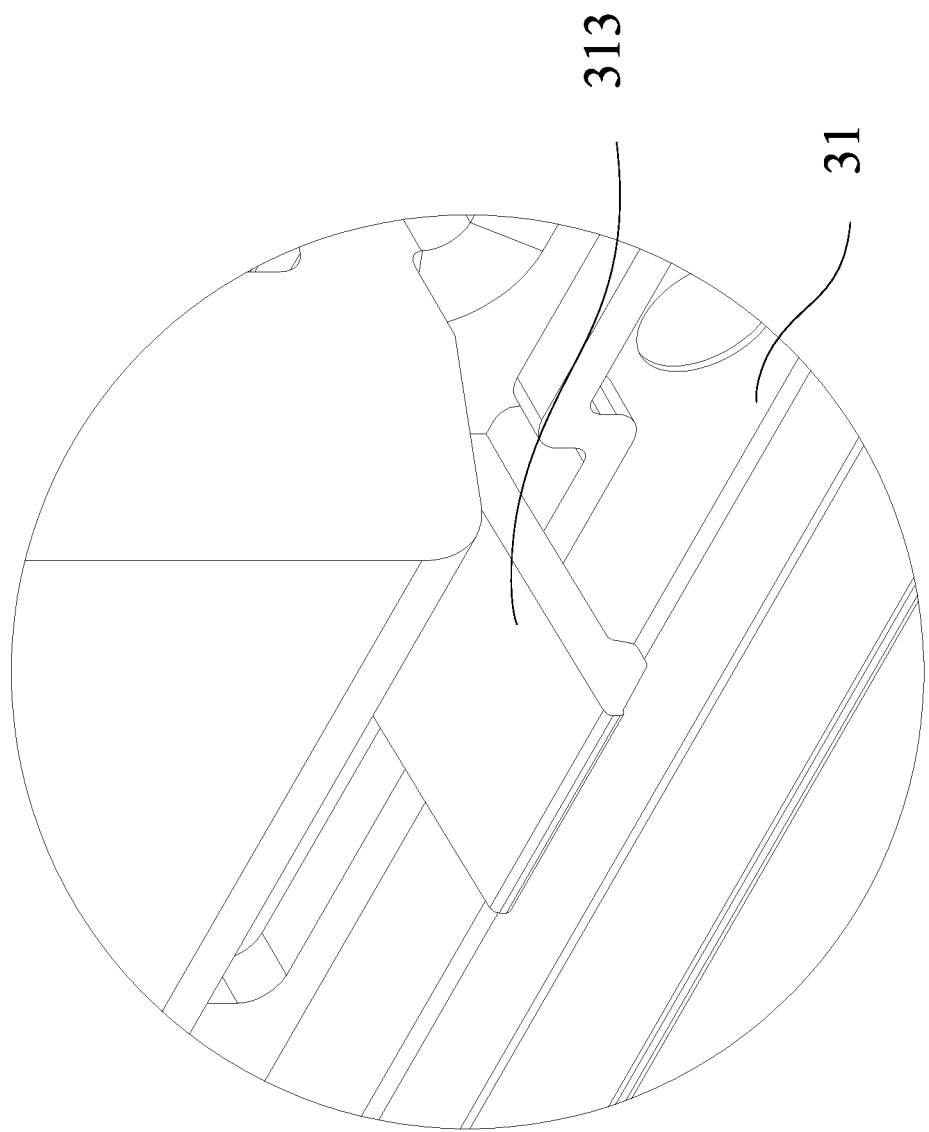
FIG. 10 is a locally enlarged view of position D in FIG. 2.
Figure 11:
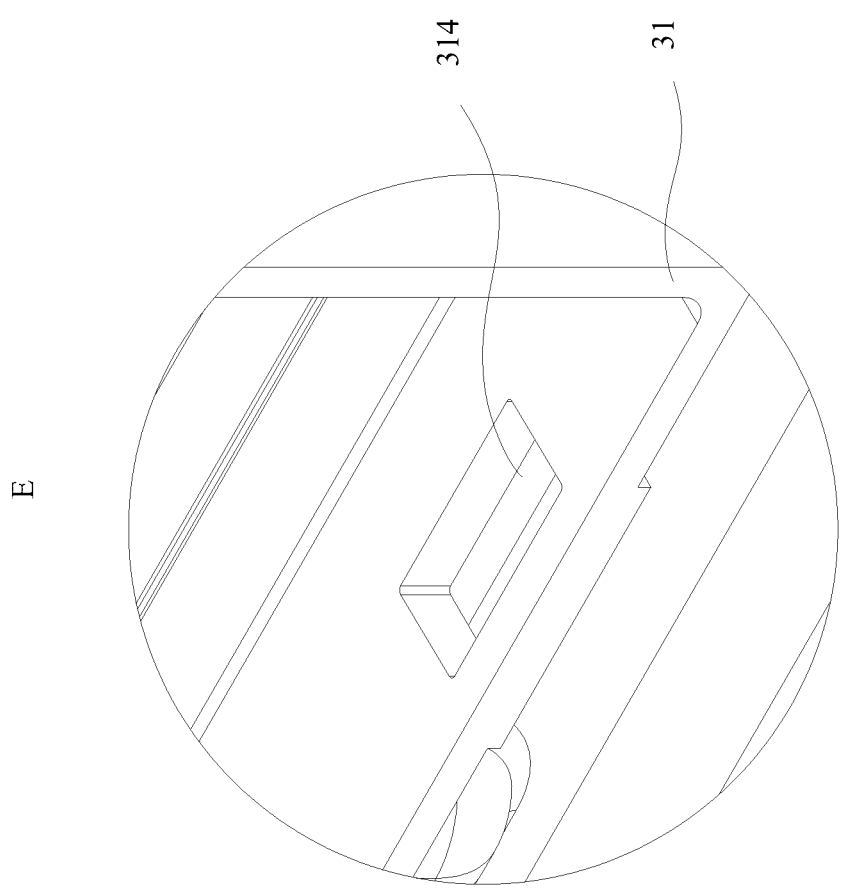
FIG. 11 is a locally enlarged view of position E in FIG. 2.

FIG. 8 is a locally enlarged view of position B in FIG. 2; FIG. 9 is a locally enlarged view of position C in FIG. 2; FIG. 10 is a locally enlarged view of position D in FIG. 2; and FIG. 11 is a locally enlarged view of position E in FIG. 2. As shown in FIG. 8 to FIG. 11, to facilitate installation and removal of the cell management unit 4, in this embodiment of this application, the cell management unit 4 is connected to the first body 312a.

Specifically, a first slot 41 is provided in one of the cell management unit 4 and the first body 312a, a second buckle 313 is disposed on the other, a protrusion 42 is disposed in the first slot 41, and the protrusion 42 is fitted to the second buckle 313; and/or, a first buckle 43 is disposed in one of the cell management unit 4 and the first body 312a, a second slot 314 is provided on the other, and the first buckle 43 is fitted to the second slot 314.

With the slot and the buckle disposed on the first body 312a and the cell management unit 4, the first body 312a is connected to the cell management unit 4. In this embodiment of this application, specific disposition of the slot and the buckle on the cell management unit 4 or the first body 312a is not limited provided that the first body 312a can be connected to the cell management unit 4. In this embodiment, the first slot 41 is provided on a side, facing a top surface of the battery module 100, of the cell management unit 4, and the first buckle 43 is disposed on a side of the cell management unit 4 facing away from the top surface of the battery module 100. In this case, the first end sub-plate 31 further includes an extension 316, the extension 316 is connected to a side of the first body 312a facing the cell management unit 4, and the extension 316 extends in a length direction (X direction) of the battery module 100. The second slot 314 is formed in the extension 316, and the first buckle 43 is formed in the cell management unit 4.

In the foregoing embodiment, the first slot 41 is provided on the side of the cell management unit 4 facing the top surface of the battery module 100, the protrusion 42 is formed in the first slot 41, and the second buckle 313 is disposed at a position, corresponding to the first slot 41, of the first body 312a. When the second buckle 313 is fitted to the first slot 41, the second buckle 313 extends into the first slot 41 to engage with the protrusion 42, so as to limit relative displacement of the first body 312a and the cell management unit 4 along the length direction (X direction) of the battery module 100. In addition, the first buckle 43 is formed on the side of the cell management unit 4 facing away from the top surface of the battery module 100, and the second slot 314 is formed in the extension 316. When the cell management unit 4 is fitted to the extension 316, the first buckle 43 is inserted into the second slot 314, so as to limit relative displacement of the cell management unit 4 and the first body 312a along a height direction (Z direction) of the battery module 100, thereby implementing installation and position limiting of the cell management unit 4, and improving assembly stability of the end plate 3 and the cell management unit 4.

To further implement position limiting for the cell management unit 4, the first end sub-plate 31 further includes a limiting plate 315. The limiting plate 315 is connected to a side of the first body 312a facing the cell management unit 4, so as to limit displacement of the cell management unit 4 along the width direction of the battery module 100.

In this embodiment of this application, the limiting plate 315 is disposed on the side of the first body 312a facing the cell management unit 4. Two limiting plates 315 are arranged in the width direction (Y direction) of the battery module 100, and are disposed on both sides of the cell management unit 4. Ends of the two limiting plates 315 facing the extension 316 are connected to two ends of the extension 316. When the cell management unit 4 is fitted to the end plate 3, the two limiting plates 315 and the extension 316 enclose an installation area of the cell management unit 4, which can effectively prevent the cell management unit 4 from being assembled to an incorrect position and improve assembly efficiency of the cell management unit 4 and the end plate 3. In addition, after installation of the cell management unit 4 is completed, the limiting plate 315 can limit relative displacement of the cell management unit 4 and the end plate 3 along the width direction of the battery module 100, thereby avoiding large relative displacement between the cell management unit 4 and the end plate 3, and improving connection stability of the cell management unit 4 and the end plate 3.

Figure 12:
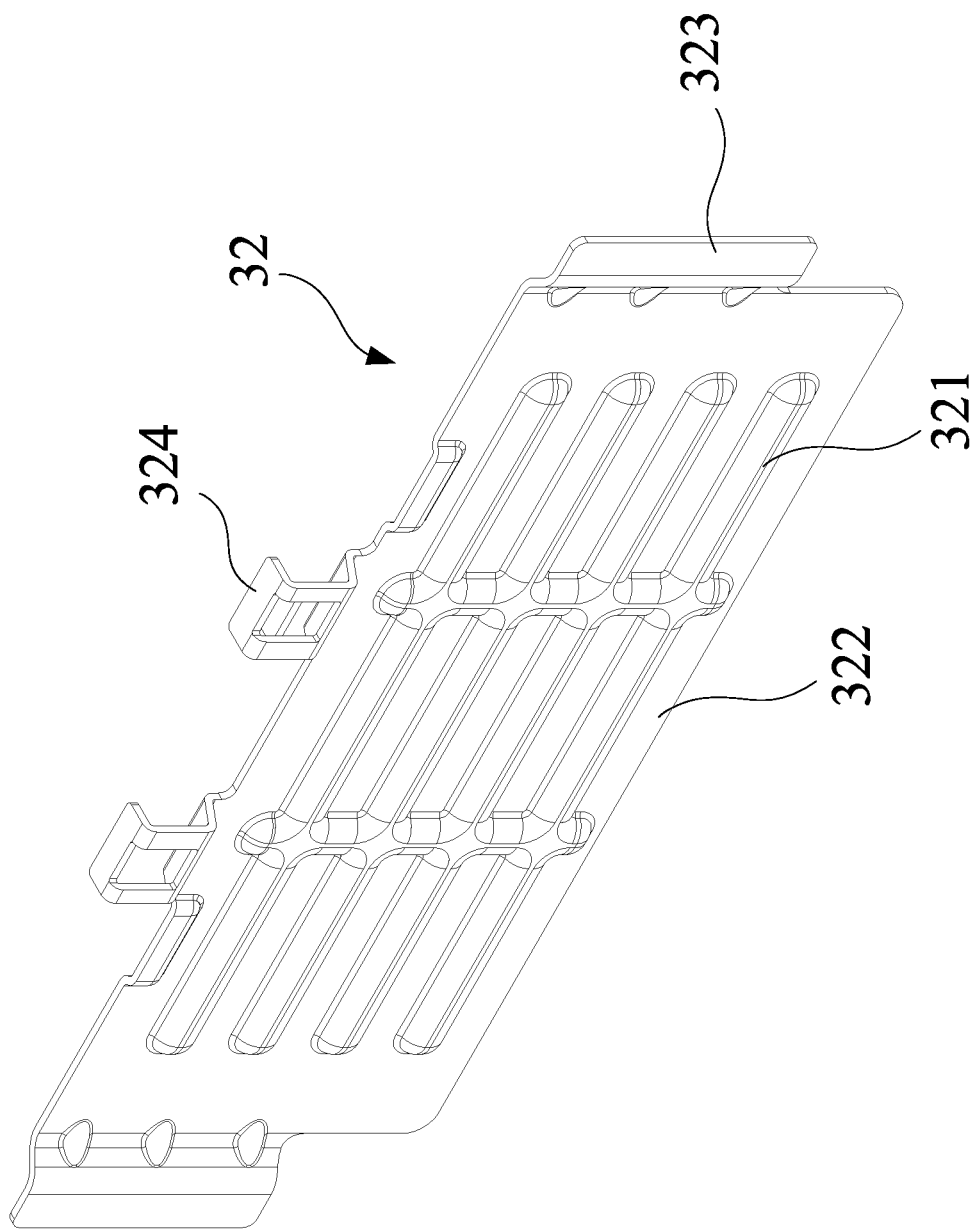
FIG. 12 is a schematic structural diagram of a second end sub-plate in a battery module according to an embodiment of this application.

FIG. 12 is a schematic structural diagram of a second end sub-plate in a battery module according to an embodiment of this application. As shown in FIG. 12, in an implementation of the foregoing second end sub-plate 32, a reinforcing rib 321 is formed on one or both sides of the second end sub-plate 32 along a length direction (X direction) of the battery module 100.

The reinforcing rib 321 is formed on a surface of the second end sub-plate 32, which can effectively increase strength of the second end sub-plate 32. When an expansion force acts on the second end sub-plate 32, an amount of deformation of the second end sub-plate 32 can be reduced because the second end sub-plate 32 has relatively large strength, that is, larger strength of the second end sub-plate 32 indicates a smaller size of a buffer spacing 35 formed between the second end sub-plate 32 and a first end sub-plate 31, thereby reducing a thickness of the end plate 3 and a volume of the battery module 100.

Figure 13:
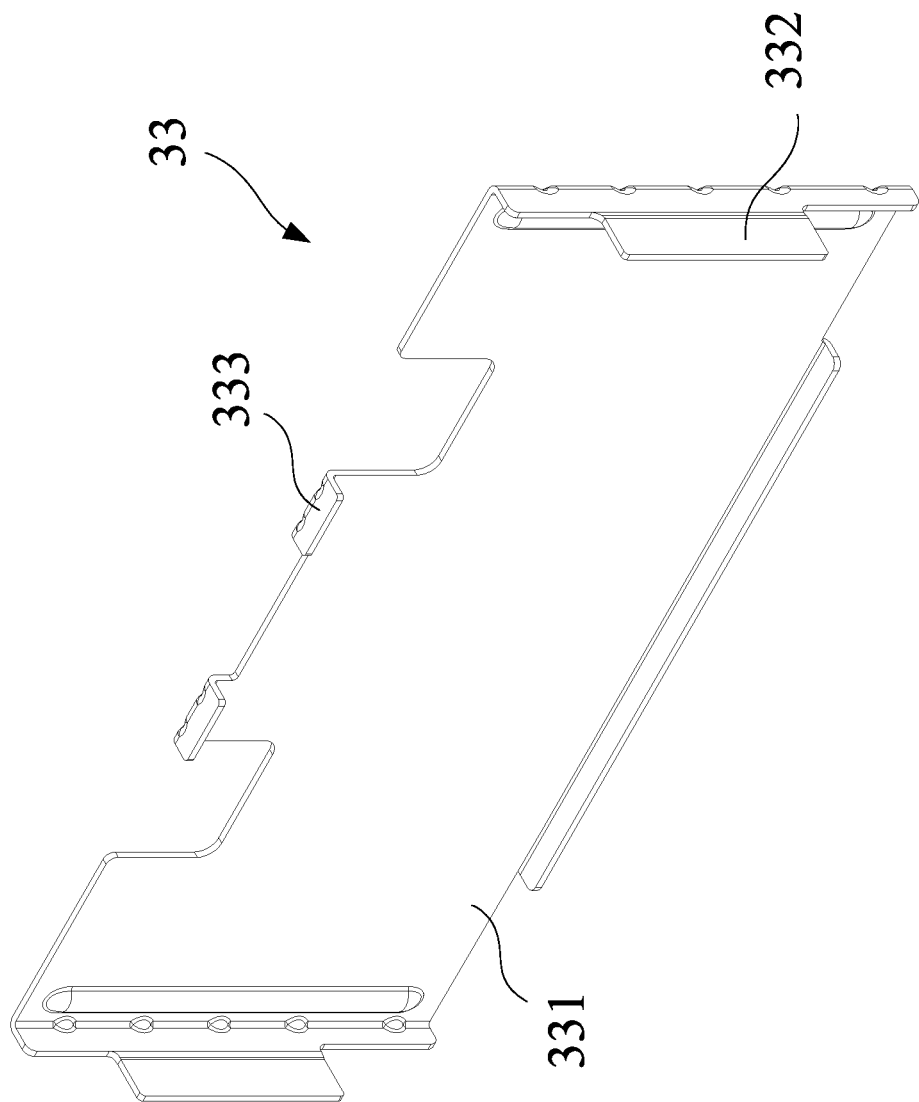
FIG. 13 is a schematic structural diagram of a third end sub-plate in a battery module according to an embodiment of this application.

FIG. 13 is a schematic structural diagram of a third end sub-plate in a battery module according to an embodiment of this application. As shown in FIG. 13, in an implementation of the foregoing end plate 3, the end plate 3 further includes a third end sub-plate 33. The third end sub-plate 33 is connected to a side of a second end sub-plate 32 facing away from a first end sub-plate 31.

During charging of a battery cell 1, the battery cell 1 generates an expansion force, and the expansion force directly acts on the end plate 3. To prevent stress concentration when the expansion force acts on the second end sub-plate 32, in this embodiment of this application, the third end sub-plate 33 is disposed on the side of the second end sub-plate 32 facing away from the first end sub-plate 31, and the third end sub-plate 33 is a flat plate structure. It should be noted that the flat plate structure is not in an absolute flat plate state provided that a main surface close to the battery cell is relatively flat. For example, a groove structure provided on the surface of the third end sub-plate 33 to accommodate adhesive and cushion may also be considered as a flat plate structure. The expansion force generated by the battery cell 1 directly acts on the third end sub-plate 33. Because the third end sub-plate 33 is a flat plate structure, when the expansion force acts on the third end sub-plate 33, the third end sub-plate 33 is not prone to produce stress concentration, and uniformly applies the received expansion force to the second end sub-plate 32, so that the second end sub-plate 32 is neither prone to produce stress concentration, thereby effectively improving the service life of the second end sub-plate 32, that is, improving the service life of the cell management unit 4 and the battery module 100.

In order to connect the first end sub-plate 31, the second end sub-plate 32, and the third end sub-plate 33, in this embodiment of this application, connection members are disposed at both ends of the first end sub-plate 31, the second end sub-plate 32, and the third end sub-plate 33 along a width direction (Y direction) of the battery module 100.

Specifically, first connection members 311a are disposed on both sides of the metal plate 311 along the width direction of the battery module 100. The second end sub-plate 32 includes a second body 322 and second connection members 323 along the width direction of the battery module 100, and the second connection members 323 are connected to both sides of the second body 322 along the width direction of the battery module 100. The third end sub-plate 33 includes a third body 331 and third connection members 332 along the width direction of the battery module 100, and the third connection members 332 are connected to both sides of the third body 331 along the width direction of the battery module 100. The first connection member 311a, the second connection member 323, and the third connection member 332 are connected.

In the first end sub-plate 31, the second end sub-plate 32, and the third end sub-plate 33, the first connection members 311a are disposed on both sides of the metal plate 311 in the first end sub-plate 31; the second connection members 323 are disposed on both sides of the second body 322 in the second end sub-plate 32; the third connection members 332 are disposed on both sides of the third body 331 in the third end sub-plate 33. Finally, the first connection member 311a, the second connection member 323, and the third connection member 332 are connected to ensure stability of connection between the first end sub-plate 31, the second end sub-plate 32, and the third end sub-plate 33. In addition, disposition of the first connection member 311a, the second connection member 323, and the third connection member 332 can avoid damages to structures formed on surfaces of the first body 312a, the second body 322, and the third body 331 during connection of the first end sub-plate 31, the second end sub-plate 32, and the third end sub-plate 33, thereby ensuring structural reliability of the end plate 3.

Figure 14:
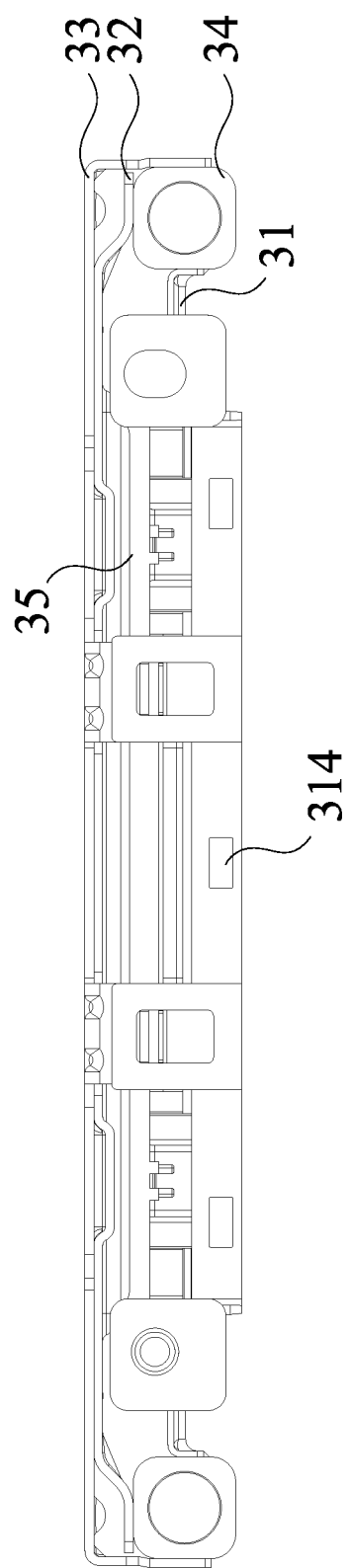
FIG. 14 is a schematic structural top view of an end plate in a battery module according to an embodiment of this application.

FIG. 14 is a schematic structural top view of an end plate of a battery module according to an embodiment of this application. As shown in FIG. 4 to FIG. 14, specifically, the foregoing end plate 3 further includes a sleeve 34, and a center line of the sleeve 34 extends along a height direction (Z) of a battery module 100. A first connection member 311a, a second connection member 323, and a third connection member 332 are all connected to an outer wall of the sleeve 34.

In order to securely connect a first end sub-plate 31, a second end sub-plate 32, and a third end sub-plate 33, the end plate 3 further includes the sleeve 34. The first connection member 311a, the second connection member 323, and the third connection member 332 are connected to the outer wall of the sleeve. In this embodiment, the sleeve 34 is disposed on both sides of the second end sub-plate 32 along a width direction (Y direction) of the battery module 100. The first connection member 311a, the second connection member 323, and the third connection member 332 are welded to the sleeve 34, to form a stable structure for the end plate 3.

In order to facilitate handling and transport of the end plate 3 and the battery module 100, an insulation fastener 312 includes a first lifting member 312b, and the first lifting member 312b is disposed at the top of a first body 312a along a height direction of the battery module 100. The second end sub-plate 32 includes a second lifting member 324, and the second lifting member 324 is disposed on the top of the second end sub-plate 32 along the height direction of the battery module 100. The third end sub-plate 33 includes a third lifting member 333, and the third lifting member 333 is disposed at the top of the third end sub-plate 33 along the height direction of the battery module 100. After the first lifting member 312b, the second lifting member 324, and the third lifting member 333 are connected, a lifting member 5 used for lifting the battery module 100 is formed.

After connection of the first end sub-plate 31, the second end sub-plate 32, and the third end sub-plate 33 is completed, the first lifting member 312b, the second lifting member 324, and the third lifting member 333 are connected along the height direction (Z direction) of the battery module 100, so as to move the end plate 3 and the battery module 100.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A battery module, comprising:
a plurality of battery cells arranged sequentially;
an end plate, wherein the end plate comprises a first end sub-plate and a second end sub-plate, the first end sub-plate and the second end sub-plate are arranged in a length direction (X) of the battery module, the second end sub-plate is closer to the battery cells than the first end sub-plate, and a buffer spacing is formed between the first end sub-plate and the second end sub-plate; and a cell management unit, wherein the cell management unit is disposed on a side of the first end sub-plate facing away from the second end sub-plate, wherein the first end sub-plate comprises a metal plate and an insulation fastener;

the insulation fastener comprises a first body;

the metal plate is inserted into the first body and the metal plate is closer to the battery cells than the insulation fastener;

first connection members are disposed on both sides of the metal plate along a width direction of the battery module;

the insulation fastener comprises a first lifting member, and the first lifting member is disposed at the top of the first body along a height direction of the battery module; and the cell management unit is secured to the side of the first body facing away from the second end sub-plate.

2. The battery module according to claim 1, wherein a first slot is provided in one of the cell management unit and the first body, and a second buckle is disposed on the other of the cell management unit and the first body; and a protrusion is disposed in the first slot, and the protrusion is fitted to the second buckle; and/or a first buckle is disposed in one of the cell management unit and the first body, and a second slot is provided on the other of the cell management unit and the first body; and the first buckle is fitted to the second slot.

3. The battery module according to claim 2, wherein the first end sub-plate further comprises an extension;

the extension is connected to a side of the first body facing the cell management unit, and the extension extends along the length direction (X) of the battery module;

the second slot is formed in the extension; and the first buckle is formed in the cell management unit.

4. The battery module according to claim 1, wherein the first end sub-plate further comprises a limiting plate; and the limiting plate is connected to a side of the first body facing the cell management unit to limit displacement of the cell management unit along a width direction of the battery module.

5. The battery module according to claim 1, wherein the end plate further comprises a third end sub-plate; and the third end sub-plate is connected to a side of the second end sub-plate facing away from the first end sub-plate.

6. The battery module according to claim 5, wherein the second end sub-plate comprises a second body and second connection members along the width direction of the battery module, and the second connection members are connected to both sides of the second body along the width direction of the battery module; the third end sub-plate comprises a third body and third connection members along the width direction of the battery module, and the third connection members are connected to both sides of the third body along the width direction of the battery module; and the first connection member, the second connection member, and the third connection member are connected.

7. The battery module according to claim 6, further comprising a sleeve, wherein a center line of the sleeve extends along a height direction (Z) of the battery module; and the first connection member, the second connection member, and the third connection member are all connected to an outer wall of the sleeve.

8. The battery module according to claim 5, wherein the second end sub-plate comprises a second lifting member, and the second lifting member is disposed at the top of the second end sub-plate along the height direction of the battery module; the third end sub-plate comprises a third lifting member, and the third lifting member is disposed at the top of the third end sub-plate along the height direction of the battery module; and after the first lifting member, the second lifting member, and the third lifting member are connected, a lifting member used for lifting the battery module is formed.

9. The battery module according to claim 1, wherein a reinforcing rib is formed on one or both sides of the second end sub-plate along the length direction of the battery module.

10. The battery module according to claim 5, wherein the third end sub-plate is generally a flat plate structure, and a groove structure for adhesive or a cushion is provided on a surface of the third end sub-plate.

11. A battery pack, comprising:

a case; and a battery module disposed in the case, wherein the battery module further comprises:

a plurality of battery cells arranged sequentially;

an end plate, wherein the end plate comprises a first end sub-plate and a second end sub-plate, the first end sub-plate and the second end sub-plate are arranged in a length direction (X) of the battery module, the second end sub-plate is closer to the battery cells than the first end sub-plate, and a buffer spacing is formed between the first end sub-plate and the second end sub-plate; and a cell management unit, wherein the cell management unit is disposed on a side of the first end sub-plate facing away from the second end sub-plate, wherein the first end sub-plate comprises a metal plate and an insulation fastener;

the insulation fastener comprises a first body;

the metal plate is inserted into the first body and the metal plate is closer to the battery cells than the insulation fastener;

first connection members are disposed on both sides of the metal plate along a width direction of the battery module;

the insulation fastener comprises a first lifting member, and the first lifting member is disposed at the top of the first body along a height direction of the battery module; and the cell management unit is secured to the side of the first body facing away from the second end sub-plate.

12. The battery pack according to claim 11, wherein a first slot is provided in one of the cell management unit and the first body, and a second buckle is disposed on the other of the cell management unit and the first body; and a protrusion is disposed in the first slot, and the protrusion is fitted to the second buckle; and/or a first buckle is disposed in one of the cell management unit and the first body, and a second slot is provided on the other of the cell management unit and the first body; and the first buckle is fitted to the second slot.

13. The battery pack according to claim 12, wherein the first end sub-plate further comprises an extension;

the extension is connected to a side of the first body facing the cell management unit, and the extension extends along the length direction (X) of the battery module;

the second slot is formed in the extension; and the first buckle is formed in the cell management unit.

14. The battery pack according to claim 11, wherein the first end sub-plate further comprises a limiting plate; and the limiting plate is connected to a side of the first body facing the cell management unit to limit displacement of the cell management unit along a width direction of the battery module.

15. The battery pack according to claim 11, wherein the end plate further comprises a third end sub-plate; and the third end sub-plate is connected to a side of the second end sub-plate facing away from the first end sub-plate.

16. The battery pack according to claim 15, wherein the second end sub-plate comprises a second body and second connection members along the width direction of the battery module, and the second connection members are connected to both sides of the second body along the width direction of the battery module; the third end sub-plate comprises a third body and third connection members along the width direction of the battery module, and the third connection members are connected to both sides of the third body along the width direction of the battery module; and the first connection member, the second connection member, and the third connection member are connected.

17. The battery pack according to claim 15, wherein the second end sub-plate comprises a second lifting member, and the second lifting member is disposed at the top of the second end sub-plate along the height direction of the battery module; the third end sub-plate comprises a third lifting member, and the third lifting member is disposed at the top of the third end sub-plate along the height direction of the battery module; and after the first lifting member, the second lifting member, and the third lifting member are connected, a lifting member used for lifting the battery module is formed.

18. The battery pack according to claim 15, wherein the third end sub-plate is generally a flat plate structure, and a groove structure for adhesive or a cushion is provided on a surface of the third end sub-plate.

* * * * *